United States Patent
Treiber et al.

[11] 3,759,974
[45] Sept. 18, 1973

[54] SUBSTITUTED 4-CYANO-4-PHENYL-AMINOCYCLOHEXANES

[75] Inventors: Hans-Joerg Treiber, Bruehl; Frank Zimmermann, Mannheim, both of Germany

[73] Assignee: Knoll A.G. Chemische Fabriken, Ludwigshafen/Rhine, Germany

[22] Filed: Sept. 9, 1969

[21] Appl. No.: 856,498

[30] Foreign Application Priority Data
Sept. 10, 1968 Germany................... P 17 93 383.4

[52] U.S. Cl....... 260/465 E, 260/465 R, 260/465 F, 260/465 G, 424/304
[51] Int. Cl............................................. C07c 121/64
[58] Field of Search .................................. 260/465 E

[56] References Cited
UNITED STATES PATENTS
3,261,859   7/1966   Dengel............................ 260/465 E

*Primary Examiner*—Lewis Gotts
*Assistant Examiner*—C. F. Warren
*Attorney*—Gerald J. Weiser

[57] ABSTRACT

Basically substituted 4-cyano-4-phenyl-aminocyclohexanes of the general formula

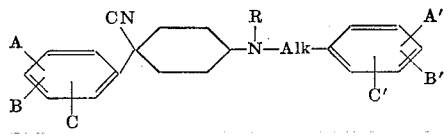

wherein A, B, C, A', B', C' are each hydrogen, halogen, trifluoromethyl, lower alkyl or lower alkoxy; R is hydrogen or lower alkyl; and Alk is straight or branched chain lower alkylene or hydroxy lower alkylene, their acid addition salts and their pharmaceutical composition. The compounds and compositions are valuable blood pressure depressants, which also exhibit spasmolytic, neuroleptic and coronary dilating properties.

29 Claims, No Drawings

SUBSTITUTED 4-CYANO-4-PHENYL-AMINOCYCLOHEXANES

This invention relates to new basically substituted 4-cyano-4-phenyl-aminocyclohexanes and their pharmaceutically acceptable compositions.

South African Pat. 66/5390, published 20 Feb. 1967 discloses that basic cyano-phenylcyclohexyl compounds antagonize morphine and mescaline and exhibit antitussive properties and an analgesic effect. South African Pat. 65/6301 published 15 June, 1966 discloses that 4,4-diphenyl-cyclohexylamines exhibit spasmolytic and parasympathicolytic and blood pressure-lowering properties.

U.S. Pat. 3,261,859 as well as German Pats. 1,154,810 and 1,158,063 and German Pat. applications P15 93 921.6 published 1 Oct. 1970 and P16 43 429.0 published 28 Jan. 1971 disclose that basically substituted phenylacetonitriles are cardiac symphatholytics and coronary dilators.

The present basically substituted 4-cyano-4-phenyl-aminocyclohexanes are blood pressure depressants and exhibit spasmolytic and neuroleptic properties as well as coronary activity, such as dilation of the coronary vessels, and are hence useful in the treatment of hypertension, anginal seizures and related ailments.

The present compounds are represented by the following general formula:

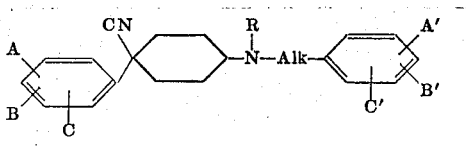

I wherein A, B, C, A', B', C' are each hydrogen, halogen, trifluoromethyl, lower alkyl or lower alkoxy; R is hydrogen or lower alkyl; and Alk is straight or branched chain lower alkylene or hydroxy lower alkylene as well as their acid addition salts.

In the preferred compounds of the above general formula A, B, C, A', B', C' are each hydrogen, chlorine, trifluoromethyl, methyl, methoxy or ethoxy; R is hydrogen or methyl; and Alk is ethylene, n-propylene, α-methylethylene or α-methyl-β-hydroxyethylene.

Generally the compounds can be prepared by a number of methods. Thus, for example, the 4-cyano-4-phenylcyclohexanones of the general formula

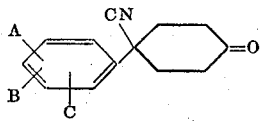

II are subjected in a known manner to reductive condensation with aralkylamines of the general formula:

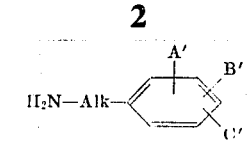

III to obtain the secondary amines which may then be methylated by known procedures. A, B, C, A', B', C' and Alk are as defined hereinabove.

The reductive condensation of the 4-cyano-4-phenyl-cyclohexanones of the general formula II with the amines of the general formula III can be carried out, for example, with hydrogen in the presence of noble metal, nickel, or cobalt catalysts at normal pressure or at increased pressure or in the presence of activated metallic aluminum. The reductive condensation can also be accomplished using sodium boronhydride wherein the azomethine is first prepared by splitting off water and then is reduced. The amines obtained can be purified either by distillation or by conversion into their hydrochlorides.

The secondary amines obtained can be methylated by known procedures, preferably using formaldehyde and formic acid.

The compounds of the instant invention are readily convertible to their water soluble salts with inorganic or organic acids.

The 4-cyano-4-phenyl-cyclohexanones of the formula III, which are employed as initial material, are obtainable, for example, by the method described by E.C. Horning et al., J.Am.Chem.Soc. 74:773 (1952), using an ester condensation of pimelic acid esters, subsequent saponification and decarboxylation.

EXAMPLE 1

4-Cyano-4-phenyl-β-(3,4-dimethoxyphenyl)-ethyl-aminocyclohexane 19.9 g (0.1 mol) 4-cyano-4-phenyl-cyclohexanone (prepared from γ-cyano-γ-phenyl-pimelic acid-dimethyl ester) and 18.1 g (0.1 mol) homoveratrylamine are dissolved in 100 cc dry toluene and heated to boiling. The water of reaction is azeotropically removed. Thereafter the solvent is distilled off, the residue treated with 150 cc methanol and hydrogenized by the addition in portions of 2.5 g sodium boronhydride.

After one hour, the reaction mixture is concentrated to dryness and treated with 200 cc 2N potassium hydroxide solution and 200 cc ether. Then the aqueous layer is extracted by shaking two more times with ether and the combined etherial solutions are dried. Dry hydrogen chloride is introduced into the etherial solution until saturation. The hydrochloride precipitated is sucked off and recrystallized from isopropanol. 26.7 g (73% of the theory) of 4-cyano-4-phenyl-β-(3,4-dimethoxy-phenyl)-ethyl-aminocyclohexane hydrochloride (mp=221 – 222°C) is obtained.

The compounds of Table 1 have been prepared in a like manner as in the foregoing Example 1.

TABLE 1

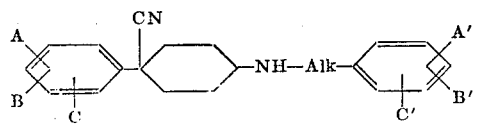

| Ex. | A B C | Alk | A' B' C' | M.P.,° F. hydrochloride | Yield in percent of pure hydrochloride | Name |
|---|---|---|---|---|---|---|
| 2 | phenyl | —CH₂—CH₂— | phenyl | 233–134 | 67 | 4-cyano-4-phenyl-β-phenylethyl-aminocyclohexane. |
| 3 | Same as above | Same as above | 3,4,5-trimethoxyphenyl (OCH₃, OCH₃, OCH₃) | 239–240 | 63 | 4-cyano-4-phenyl-β-(3,4,5-trimethoxyphenyl)-ethylaminocyclohexane. |
| 4 | do | do | 3,4-diethoxyphenyl (OC₂H₅, OC₂H₅) | 229 | 65 | 4-cyano-4-phenyl-β-(3,4,-diethoxyphenyl)-ethylaminocyclohexane. |
| 5 | do | —CH(CH₃)—CHOH— | phenyl | ¹ 126–127 | 59 | 4-cyano-4-phenyl-(α-methyl-J-hydroxy-β-phenyl)-ethylaminocyclohexane. |
| 6 | 2-methylphenyl (CH₃) | —CH₂—CH₂— | Same as above | 239–240 | 49 | 4-cyano-4-(2-methylphenyl)-β-phenylethyl-aminocyclohexane. |
| 7 | Same as above | —CH₂—CH₂—CH₂— | do | 246–247 | 52 | 4-cyano-4-(2-methylphenyl)-γ-phenylpropyl-aminocyclohexane. |
| 8 | do | —CH₂—CH₂— | 3,4,5-trimethoxyphenyl (OCH₃, OCH₃, OCH₃) | 233–234 | 30 | 4-cyano-4-(2-methylphenyl)-β-3,4,5-trimethoxyphenyl)-ethylaminocyclohexane. |
| 9 | do | Same as above | 4-chlorophenyl (Cl) | 243–244 | 26 | 4-cyano-4-(2-methylphenyl)-β-(4-chlorophenyl)-ethylaminocyclohexane. |
| 10 | do | do | 3-trifluoromethylphenyl (CF₃) | 244–245 | 35 | 4-cyano-4-(2-methylphenyl)-β-(3-trifluoromethylphenyl)-ethylaminocyclohexane. |
| 11 | do | —CH(CH₃)—CH₂— | phenyl | 240 | 27 | 4-cyano-4-(2-trifluoromethylphenyl)-α-methyl-β-phenylethyl-aminocyclohexane. |
| 12 | do | —CH₂—CH₂— | 3,4-dimethoxyphenyl (OCH₃, OCH₃) | 227–228 | 25 | 4-cyano-4-(2-trifluoromethylphenyl)-β-(3,4-dimethoxyphenyl)-ethyl-aminocyclohexane. |
| 13 | 3,4-dimethoxyphenyl (CH₃O, CH₃O) | Same as above | phenyl | 224 | 69 | 4-cyano-4-(3,4-dimethoxyphenyl)-β-phenylethyl-aminocyclohexane. |
| 14 | Same as above | do | 3,4-dimethoxyphenyl (OCH₃, OCH₃) | 239–240 | 55 | 4-cyano-4-(3,4-dimethoxyphenyl)-β-(3,4-dimethoxyphenyl)-ethylaminocyclohexane. |
| 15 | do | —CH(CH₃)—CH₂— | phenyl | 239 | 62 | 4-cyano-4-(3,4-dimethoxyphenyl)-α-methyl-β-phenylethyl-aminocyclohexane. |
| 16 | 3,4-diethoxyphenyl (C₂H₅O, C₂H₅O) | —CH₂—CH₂— | 3,4,5-trimethoxyphenyl (OCH₃, OCH₃, OCH₃) | 228–229 | 36 | 4-cyano-4-(3,4-diethoxyphenyl)-β-(3,4,5-trimethoxyphenyl)-ethyl-aminocyclohexane. |
| 17 | Same as above | Same as above | 3,4-dimethoxyphenyl (OCH₃, OCH₃) | 243–244 | 45 | 4-cyano-4-(3,4-diethoxyphenyl)-β-(3,4-dimethoxyphenyl)-ethylaminocyclohexane. |
| 18 | do | do | 4-methoxyphenyl (OCH₃) | 226–227 | 53 | 4-cyano-4-(3,4-diethoxyphenyl)-β-(4-methoxyphenyl)-ethylaminocyclohexane. |
| 19 | 4-chlorophenyl (Cl) | do | phenyl | 243–244 | 78 | 4-cyano-4-(4-chlorophenyl)-β-phenyl-ethyl-aminocyclohexane. |

TABLE 1

[Structure: A,B,C-phenyl-C(CN)-cyclohexane-NH-Alk-phenyl-A',B',C']

| Ex. | A,B,C-phenyl | Alk | A',B',C'-phenyl | M.P., °F. hydrochloride | Yield in percent of pure hydrochloride | Name |
|---|---|---|---|---|---|---|
| 20 | Same as above | do | 3,4-(OCH₃)₂-phenyl | 235 | 72 | 4-cyano-4-(4-chlorophenyl)-β-(3,4-dimethoxyphenyl)-ethylaminocyclohexane. |
| 21 | do | —CH(CH₃)—CH₂— | phenyl | 257 | 50 | 4-cyano-4-(4-chlorophenyl)-α-methyl-β-phenylethyl-aminocyclohexane. |
| 22 | 2,4-Cl₂-phenyl | —CH₂CH₂— | 3,4-(OCH₃)₂-phenyl | 244–245 | 73 | 4-cyano-4-(2,4-dichlorophenyl)-β-(3,4-dimethoxyphenyl)-ethyl-aminocyclohexane. |
| 23 | Same as above | Same as above | 3,4-(OC₂H₅)₂-phenyl | 237–238 | 71 | 4-cyano-4-(2,4-dichlorophenyl)-β-(3,4-diethoxyphenyl)-ethylaminocyclohexane. |
| 24 | do | —CH(CH₃)—CHOH— | phenyl | 221–222 | 27 | 4-cyano-4-(2,4-dichlorophenyl)-α-methyl-β-hydroxy-β-phenylethylaminocyclohexane. |

¹ Bases.

EXAMPLE 25

4-Cyano-4-phenyl-N-methyl-N-(β-phenylethyl)-aminocyclohexane 30.4 g (0.1 mol) 4-cyano-4-phenyl-N-(β-phenylethyl)-aminocyclohexane (prepared from 4-cyano-4-phenyl-cyclohexanone and β-phenylethylamine, according to the Example 1) and 7.4 g (0.16 mol) 98% formic acid are dissolved in 300 cc ethanol and heated to boiling for 30 minutes. 13.7 g (0.12 mol) 38% formaline is dropped into the reaction mixture in the course of 30 minutes, which is heated under reflux for one hour, and again 5 g formaline is added and kept at boiling temperature for an additional hour. Subsequently, the ethanol is distilled off, the residue is treated with 2N potassium hydroxide solution and it is extracted three times with ether. Dry hydrogen chloride is introduced into the dried etherial solution, the hydrochloride precipitated is sucked off and it is recrystallized from methanol or isopropanol.

Yield = 27.3 g (86% of the theory); mp = 242 – 243°C.

The compounds of Table 2 have been prepared in a like manner as the foregoing Example 25.

TABLE 2

[Structure: A,B,C-phenyl-C(CN)-cyclohexane-N(CH₃)-Alk-phenyl-A',B',C']

| Example | A,B,C-phenyl | Alk | A',B',C'-phenyl | M.P. °F. hydrochloride | Yield in percent of pure hydrochloride | Name |
|---|---|---|---|---|---|---|
| 26 | phenyl | —CH₂CH₂— | 3,4-(OCH₃)₂-phenyl | 196–197 | 81 | 4-cyano-4-phenyl-N-methyl-N-[β-(3,4-dimethoxyphenyl)-ethyl]-aminocyclohexane. |
| 27 | 4-Cl-phenyl | Same as above | Same as above | 193 | 93 | 4-cyano-4-(4-chlorophenyl)-N-methyl-N-[β-(3,4-dimethoxyphenyl)-ethyl]-aminocyclohexane. |
| 28 | 3,4-(CH₃O)₂-phenyl | do | do | 199–200 | 38 | 4-cyano-4-(3,4-dimethoxyphenyl)-N-methyl-N-[β-(3,4-dimethoxyphenyl)-ethyl]-aminocyclohexane. |
| 29 | Same as above | —CH(CH₃)—CH₂— | phenyl | 204–205 | 73 | 4-cyano-4-(3,4-dimethoxyphenyl)-N-methyl-N-α-methyl-β-phenylethyl)-aminocyclohexane. |

As stated hereinbefore, the compounds of Examples 2 – 24 are prepared following the procedure of Example 1 and of Example 25. The reactions between the 4-cyano-4-phenylcyclohexanones of general Formula II and the arylalkylamines of the general Formula III are carried out on a mole-to-mole ratio of the reactants at temperatures between about 50°C and 150°C, preferably in benzol at 80°C or in toluol at 110°C.

The Following Table 3 shows the amines and 4-cyano-4-arylcyclohexanones used to make the compounds listed in Tables 1 and 2 as well as the initial compounds used to make the starting hexanones.

TABLE 3

| Ex. | Amine | 4-cyano-4-arylcyclohexanone | Initial compound for 4-cyano-4-arylcyclohexanone |
|---|---|---|---|
| 2 | β-phenylethylamine | 4-cyano-4-phenyl-cyclohexanone. | γ-cyano-γ-phenyl-pimelic acid-dimethyl ester. |
| 3 | β-3,4,5-trimethoxy-phenylethylamine. | do | Do. |
| 4 | β-3,4-diethoxyphenylethylamine. | do | Do. |
| 5 | β-hydroxy-β-phenylisopropylamine. | do | Do. |
| 6 | β-phenylethylamine. | 4-cyano-4-(2-methylphenyl)-cyclohexanone. | γ-cyano-γ-(2-methylphenyl)-pimelic acid-dimethyl ester. |
| 7 | γ-phenylpropylamine. | do | Do. |
| 8 | β-3,4,5-trimethoxy-phenylethylamine. | do | Do. |
| 9 | β-4-chlorphenylethylamine. | do | Do. |
| 10 | β-3-trifluormethyl phenylethylamine. | do | Do. |
| 11 | β-phenylisopropylamine. | 4-cyano-4-(3-trifluormethylphenyl)cyclohexanone. | γ-cyano-γ-(3-trifluormethylphenyl)-pimelic acid-dimethyl ester. |
| 12 | β-3,4-dimethoxy-phenylethylamine. | do | Do. |
| 13 | β-phenylethylamine. | 4-cyano-4-(3,4-dimethoxyphenyl)cyclohexanone. | γ-cyano-γ-(3,4-dimethoxyphenyl)-pimelic acid-dimethyl ester. |
| 14 | β-3,4-dimethoxy-phenylethylamine. | do | Do. |
| 15 | β-phenylisopropylamine. | do | Do. |
| 16 | β-3,4,5-trimethoxy-phenylethylamine. | 4-cyano-4-(3,4-diethoxyphenyl)-cyclohexanone. | γ-cyano-γ-(3,4-diethoxyphenyl)-pimelic acid-dimethyl ester. |
| 17 | β-3,4-dimethoxy-phenylethylamine. | do | Do. |
| 18 | β-4-methoxyphenyl-ethylamine. | do | Do. |
| 19 | β-phenylethylamine. | 4-cyano-4-(4-chlorphenyl)-cyclohexanone. | γ-cyano-γ-(4-chlorphenyl)-pimelic acid-dimethyl ester. |
| 20 | β-3,4-dimethoxy-phenylethylamine. | do | Do. |
| 21 | β-phenylisopropylamine. | do | Do. |
| 22 | β-3,4-dimethoxy-phenylethylamine. | 4-cyano-4-(2,4-dichlorphenyl)-cyclohexanone. | γ-cyano-γ-(2,4-dichlorphenyl)-pimelic acid-dimethyl ester. |
| 23 | β-3,4-diethoxy-phenylethylamine. | do | Do. |
| 24 | β-hydroxy-β-phenyl-isopropylamine. | do | Do. |
| 26 | β-3,4-dimethoxy-phenylethylamine. | 4-cyano-4-phenyl-cyclohexanone. | γ-cyano-γ-phenyl-pimelic acid-dimethyl ester. |
| 27 | do | 4-cyano-4-(4-chlorphenyl.-cyclohexanone. | γ-cyano-γ-(4-chlorphenyl)-pimelic acid-dimethyl ester. |
| 28 | do | 4-cyano-4-(3,4-dimethoxyphenyl)-cyclohexanone. | γ-cyano-γ-(3,4-dimethoxyphenyl)-pimelic acid-dimethyl ester. |
| 29 | β-phenylisopropylamine. | do | Do. |

Additional compounds coming within the purview of the invention are 4-cyano-4-(2-chlorophenyl)-N-[β-(3,4-dimethoxyphenyl)-ethyl]-aminocyclohexane; 4-cyano-4-(4-fluorophenyl)-N-[β-(3,4-dimethoxyphenyl)-ethyl]-aminocyclohexane; 4-cyano-4-(2-chloro-phenyl)-N-[β-(3,4,5-trimethoxyphenyl)-ethyl]-aminocyclohexane; 4-cyano-4-(4-chlorophenyl)-N-[β-(3,4,5-trimethoxyphenyl)-ethyl]-aminocyclohexane; 4-cyano-4-phenyl-N-ethyl-N-[β-(3,4-dimethoxy-phenyl)-ethyl]-aminocyclohexane; 4-cyano-4-(4-bromophenyl)-N-methyl-N-[β-3,4-dimethoxyphenyl)-ethyl]-aminocyclohexane; 4-cyano-4-phenyl-N-propyl-N-(β-phenylethyl)-aminocyclohexane; 4-cyano-4-(2-ethylphenyl)-N-methyl-N-[β-(4-methoxyphenyl)-ethyl]-aminocyclohexane; and 4-cyano-4-phenyl-[β-(4-propylphenyl)-ethyl]-aminocyclohexane.

The instant 4-cyano-4-phenyl-aminocyclohexanes exhibit an unusual combination of properties in that they are spasmolytic, blood pressure depressants and are active on the blood circulatory system and also affect the nervous system.

The compounds of the present invention are used to lower the blood pressure and preferably administered orally. A dose of one to two tablets containing about 50mg. thereof three times daily is a useful dosage to produce satisfactory results. The maintenance dose is about one tablet of about 25mg. given three times daily. The dose may vary, of course. The daily dose is between about 100mg. and about 25mg. provided in three to four single doses. See "The Pharmacological Basis of Therapeutics" by Goodman and Gilman, Third Edition, The Macmillan Company, Section VI, Chapter 33, entitled "Antihypertensive Agents and The Drug Therapy of Hypertension" which as well as Section IV, is herein incorporated by reference.

Intravenous and intramuscular injection or rectal application in the form of suppositories may also be employed as mode of administration. For injections, aqueous or saline solutions can be used. The new compounds of the present invention may be administered orally in the form of tablets, pills, powders, capsules, solutions, emulsions, suspensions, dispersions, and in any other suitable form.

In the case of powders, fine, uniform dispersions of the new compounds are preferable. Such dispersion can be achieved, for instance, by mixing and milling the new compounds with a solid, pulverulent extending agent to the desired fineness, or by impregnating the already milled, finely powdered, solid carrier with a solution of the active compound in water, or a water-miscible solvent and then removing the water or solvent. As solid carriers, which are suitable for the manufacture of useful pharmaceutical preparations, various inert pulverulent distributing agents as they are conventionally used in pharmaceutical compounding may be employed. When preparing tablets, pills, powders, and the like, the commonly used diluting agents, binders, lubricants, and the like are added, such as sugar, lactose, talcum, starch, pectins; as binders gelatin, gum arabic, methyl cellulose, yeast extract, agar, tragacanth; and as lubricating agents, magnesium stearate, stearic acid, and others.

It is understood that other acid addition salt than those mentioned and described hereinabove may be prepared, forinstance, acid addition salts with sulfuric acid, sulfamic acid, phosphoric acid, hydrobromic acid, and other inorganic acids as well as with succinic acid, tartaric acid, malonic acid, maleic acid, malic acid, benzoic acid, phthalic acid, nicotinic acid, and other organic acids, provided the respective salts are pharmaceutically acceptable and substantially well tolerated in the doses administered.

As mentioned hereinbefore the instant compounds exhibit spasmolytic, blood-pressure lowering, neuroleptic and coronary effects as a result of pharmacological examination using the following methods:

I. Determination of the medium lethal does in white mice (NMRI) according to Litchfield, J.F. and Wilcoxon, F., J. Pharmacol. exp. Therap. 96, 99–113 (1949).

II. Determination of the peripheral spasmolytic effect in isolated guinea pig-Ileum with histamine dose ($2 \times 10^{-7}$ g/ml) according to Magnus, R., Pfluegers Archiv. ges. Physiol. 102, 123 (1904).

III. Determination of the bronchospasmolytic effect after histamine dose (a) and Serotonine dose (b) according to Konzett, Jr. and Roessler, R., Naunyn-Schmiedeberg's Arch. exp. Path. Pharmak. 195, 71 (1940).

IV. Determination of the antiadrenergal effect in rats after noradrenaline dose according to Janssen, P.A.J.; Niemeggers, C.J.E. and Schellekens, K.H.L.; Arzn. Fschg. 15, 104–117 (1965).

V. Determination of the neuroleptic-sedative effect in the turning wheel tests (statement of the maximum effect) according to Stewart, J., Amer. J. Physiol. 1, 40 (1898); and VI. Determination of the blood pressure-lowering effecting in rats which are under urethan-narcosis.

The foregoing articles are herein incorporated by reference.

Especially noteworthy for their spasmolytic effect are the compounds of the general formula above in which of the substituents A, B and C one is methyl or two chloro atoms, the others being hydrogen, Alk is ethylene and A', B', and C' are methoxy or ethoxy or chlorine or trifluoro, typical of which are the compounds of Examples 8, 9 and 10 and 21 and 22. Their spasmolytic effect is comparable to that of papaverine (See Goodman and Gilman, above, pages 279–280). These compounds also act on the central nervous system and their action is similar to that of the phenothiazines type drug more specially Chlorpromazine (See Goodman and Gilman, pages 159–178); likewise the compounds of the invention are effective to control and diminish spontaneous motor activity. Further, compounds of the invention exhibit the beneficial action typical of the theophyllines, like oxyethyltheophylline to relax bronchial smooth muscles (See Goodman and Gilman, pages 354–365). The compounds can thus be used in the treatment of bronchial asthma. In comparative tests compounds of the invention showed superior performance than oxyethyltheophylline. It is also noteworthy that the side effects of compounds of the invention typified by those of Examples 1, 3 8 and 21 to 25 are less than those of Chlorpromazine and that the antiadrenalgic effect is in several instances superior to that of Haloperidol, a butyrophenone which is useful in quieting agitated or manic patients especially in excited psychotic patients who cannot take phenothiazines because of allergy or other reasons. The sedative effect of the compounds of the invention is also specially noteworthy, as typified by those of Examples 3, 10 and 21 to 26, which effect is superior to that of Chlorpromazine in producing relazation and sedation. The compounds of the invention are thus useful and are administered in human therapy in like manner and in the treatment of the conditions for which the conventional compounds described above are useful. The combination of advantageous properties described above, the low toxicity and low side effects make the compounds of the invention especially valuable in the medical sciences.

What is claimed is:

1. The compound of the formula wherein A is hydrogen, chlorine, lower alkyl, B is hydrogen or lower alkoxy, C is hydrogen, chlorine or lower alkoxy, R is hydrogen or methyl, $A^1$ is hydrogen, trifluoromethyl, or lower alkoxy, $B^1$ is hydrogen, chlorine or lower alkoxy, $C^1$ is hydrogen or lower alkoxy, and Alk is straight or branched lower alkylene or hydroxy lower alkylene or the pharmaceutically acceptable acid additional salts thereof, and wherein when A to C and $A^1$ to $C^1$ represent substituents other than hydrogen, the substituents are the same.

2. The compound of claim 1 wherein R is methyl.

3. The compound of claim 1 wherein R is hydrogen.

4. The hydrochloride salt of the compound of claim 1.

5. The compound of claim 1 wherein in the 4-position the A, B, C-substituted phenyl group is selected from the following: 4-phenyl-; 4-(2-methylphenyl)-; 4-(3-trifluoromethylphenyl)-; 4-(3,4-dimethoxyphenyl)-; 4-(3,4-diethoxyphenyl) and 4-(4-chloro-phenyl); while R is hydrogen or methyl and Alk is ethylene, and the A', B', C'-substituted phenyl is selected from the following: 3,4-di- or trimethoxy- or ethoxyphenyl or phenyl substituted by a chloro or a tri-fluoro-methyl.

6. The pharmaceutically acceptable acid addition salts of a compound of claim 5.

7. The hydrochloride salt of the compound of claim 5.

8. The compound of claim 5 wherein R is methyl.

9. The compound of claim 1 wherein A is hydrogen, chlorine, trifluoromethyl, or methyl, B is hydrogen, methoxy or ethoxy, C is hydrogen, chlorine, methoxy or ethoxy, A' is hydrogen, trifluoromethyl, methoxy or ethoxy, B' is hydrogen, chlorine, methoxy or ethoxy, C' is hydrogen, methoxy or ethoxy and Alk is ethylene, n-propylene, alpha-methylethylene, or alpha-methyl-beta-hydroxyethylene.

10. The compound of claim 9 wherein A, B, C, and A' are hydrogen and B' and C' are methoxy.

11. The compound of claim 9 wherein A and B are methoxy and C, A', B' and C' are hydrogen.

12. The compound of claim 9 wherein A, B, C, A', B', and C' are each hydrogen and R is methyl.

13. The compound of claim 9 wherein R is hydrogen and Alk is α-methyl-ethylene.

14. The compound of claim 9 wherein R is hydrogen and Alk is α-methyl-β-hydroxyethylene.

15. The compound of claim 9 wherein A and B are ethoxy, C is hydrogen and A', B' and C' are methoxy.

16. The compound of claim 9 wherein A and B and A' and B' are methoxy and C and C' are hydrogen.

17. The compound of claim 9 wherein A and B are ethoxy, A' and B' are methoxy and C and C' are hydrogen.

18. The compound of claim 9 wherein A is chlorine and B, C, A', B' and C' are hydrogen.

19. The compound of claim 9 wherein A and B are chlorine and C and A', B' and C' are hydrogen.

20. The compound of claim 9 wherein A is methyl, A' is trifluoromethyl and B and C and B' and C' are hydrogen.

21. The compound of claim 9 wherein A is trifluoromethyl and B, C, A', B' and C' are hydrogen.

22. The compound of claim 9 wherein A, B and C are hydrogen, A' and B' are methoxy, C' is hydrogen and R is methyl.

23. The compound of claim 9 wherein A, B and A', B' are methoxy and R is methyl.

24. The pharmaceutically acceptable acid addition salts of a compound of claim 9.

25. 4-Cyano-4-phenyl-$\beta$-(3,4-dimethoxyphenyl)-ethyl-aminocyclohexane.

26. 4-Cyano-4-phenyl-$\beta$-phenylethyl-aminocyclohexane.

27. 4-Cyano-4-phenyl-$\beta$-(3,4,5-trimethoxyphenyl)-ethyl-aminocyclohexane.

28. 4-Cyano-4-$\beta$-(3,4-diethoxyphenyl)-ethyl-aminocyclohexane.

29. 4-Cyano-4-phenyl-N-methyl-N-($\beta$-phenylethyl)-aminocyclohexane.

* * * * *